(12) United States Patent
Buckingham

(10) Patent No.: US 11,562,290 B2
(45) Date of Patent: Jan. 24, 2023

(54) MACHINE LEARNING MODEL SCORE OBFUSCATION USING COORDINATED INTERLEAVING

(71) Applicant: Cylance Inc., Irvine, CA (US)

(72) Inventor: Hailey Buckingham, Vancouver, WA (US)

(73) Assignee: Cylance Inc., San Ramon, CA (US)

( * ) Notice: Subject to any disclaimer, the term of this patent is extended or adjusted under 35 U.S.C. 154(b) by 862 days.

(21) Appl. No.: 16/399,735

(22) Filed: Apr. 30, 2019

(65) Prior Publication Data

US 2020/0349463 A1 Nov. 5, 2020

(51) Int. Cl.
*G06F 21/56* (2013.01)
*G06N 20/00* (2019.01)
*G06N 5/04* (2006.01)

(52) U.S. Cl.
CPC .......... *G06N 20/00* (2019.01); *G06F 21/562* (2013.01); *G06N 5/048* (2013.01); *G06F 2221/033* (2013.01)

(58) Field of Classification Search
CPC ...... G06N 20/00; G06N 5/048; G06F 21/562; G06F 2221/033; G06F 21/56
See application file for complete search history.

(56) References Cited

U.S. PATENT DOCUMENTS

| | | | |
|---|---|---|---|
| 8,489,689 B1* | 7/2013 | Sharma | G06Q 10/107 709/206 |
| 2015/0128263 A1* | 5/2015 | Raugas | H04L 63/1433 726/23 |
| 2016/0224593 A1* | 8/2016 | Qiu | G06N 20/00 |
| 2019/0102700 A1 | 4/2019 | Babu et al. | |
| 2019/0286242 A1* | 9/2019 | Ionescu | G06F 17/18 |
| 2019/0370634 A1 | 12/2019 | Ferreira Moreno et al. | |
| 2020/0064444 A1* | 2/2020 | Regani | G01S 7/006 |
| 2022/0229983 A1* | 7/2022 | Zohrevand | G06N 20/00 |

OTHER PUBLICATIONS

Notice of Allowance dated Nov. 15, 2022 issued on U.S. Appl. No. 16/399,665 (10 pages).
Office Action dated May 11, 2022 issued on U.S. Appl. No. 16/399,665 (10 pages).
Office Action dated Sep. 8, 2022 issued on U.S. Appl. No. 16/399,665 (12 pages).

* cited by examiner

*Primary Examiner* — Jayesh M Jhaveri
(74) *Attorney, Agent, or Firm* — Jones Day

(57) ABSTRACT

An artefact is received. Features are extracted from this artefact which are, in turn, used to populate a vector. The vector is then input into a classification model to generate a score. The score is then modified to result in a modified score by interleaving the generated score or a mapping thereof into digits of a pseudo-score. Thereafter, the modified score can be provided to a consuming application or process. Related apparatus, systems, techniques and articles are also described.

20 Claims, 3 Drawing Sheets

MACHINE LEARNING MODEL SCORE OBFUSCATION USING COORDINATED INTERLEAVING

TECHNICAL FIELD

The subject matter described herein is directed to techniques for obfuscating the output of machine learning models using obfuscation techniques incorporating coordinated interleaving of score values.

BACKGROUND

Machine learning and other types of artificial intelligence models are being increasingly deployed across different applications and industries. Such models provide classifications which can be based, for example, on historical data with known outcomes or features. The classifications provided by such models (i.e., the model outputs, etc.) can take various forms including a Boolean output (e.g., good/bad, etc.), a numerical score (e.g., 0.00 to 1, 1 to 100, etc.), or a grouping (e.g., automobile, pedestrian, crosswalk, etc.). With some software implementations, the outputs of such models can be intercepted even when part of a larger workflow. Such interception can allow a malicious actor to manipulate the classification by such models by repeatedly providing sample input data until a desired classification is received (even if such classification is not ultimately accurate).

SUMMARY

An artefact is received. Features are extracted from this artefact which are, in turn, used to populate a vector. The vector is then input into a classification model to generate a score. The score is then modified by interleaving the generated score or a mapping thereof into digits of a pseudo-score. Thereafter, the modified score can be provided to a consuming application or process.

In some variations, features in the vector can be reduced prior to it being input into the classification model. The features can be reduced, for example, using random projection matrices, principal component analysis, or other techniques.

The classification model can be a machine learning model trained using a training data set and providing a continuous scale output.

The classification model can characterize the artefact as being malicious or benign to access, execute, or continue to execute. If the artefact is deemed malicious by the classification model, access or execution of the artefact can be prevented.

The machine learning model can include one or more of: a logistic regression model, a neural network, a concurrent neural network, a recurrent neural network, a generative adversarial network, a support vector machine, a random forest, or a Bayesian model.

The modifying can include encoding a classification of the classification model into digits of the pseudo-score. The modifying can additionally or alternatively include interleaving logical symbols in the pseudo-score. Such logical symbols can include, as an example, a set of digits paired with a logical operation to be conducted upon such digits by the consuming application or process. The modifying can alternatively include interleaving the generated score into the pseudo-score without modification.

In some implementations the pseudo-score can be generated by inputting the vector into a second model (i.e., a second classification model trained using different data, etc.). Alternatively, the pseudo-score can be generated using a time-based function and/or a mathematical function.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for obfuscating the output of an AI/machine learning model. Such obfuscation is particularly important for applications such as malware detection as it prevents a malicious actor from iteratively modifying a malicious file or code until such time that the model classifies such file or code as being safe to execute or otherwise access.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to techniques for obfuscating an output of a software-based classifier. The classifier in this regard can be an AI/machine learning model that outputs at least one value that characterizes the input to such model. While the current subject matter provides examples relating to models used for detection of malicious software ("malware"), it will be appreciated that the current subject matter can, unless otherwise specified, apply to other applications/workflows utilizing a model including, for example, autonomous vehicle navigation systems, image analysis systems, biometric security systems, video game cheat circumvention systems, and the like._

In some cases, the output of a classification model can be intercepted and exploited by a malicious actor as part of an adversarial attack. For example, data exchanged between a client and a remote server executing the classification model can be accessed such that small changes can be made to the data (e.g., file, code, artefact, etc.) input into the classification model until a desired outcome (from the point of view of the malicious actor) is obtained. For example, a malicious actor either automatically or through manual modifications can make small changes to a file encapsulating malicious code until such time that classification model determines that such file is safe to execute or otherwise access.

Figure 1:
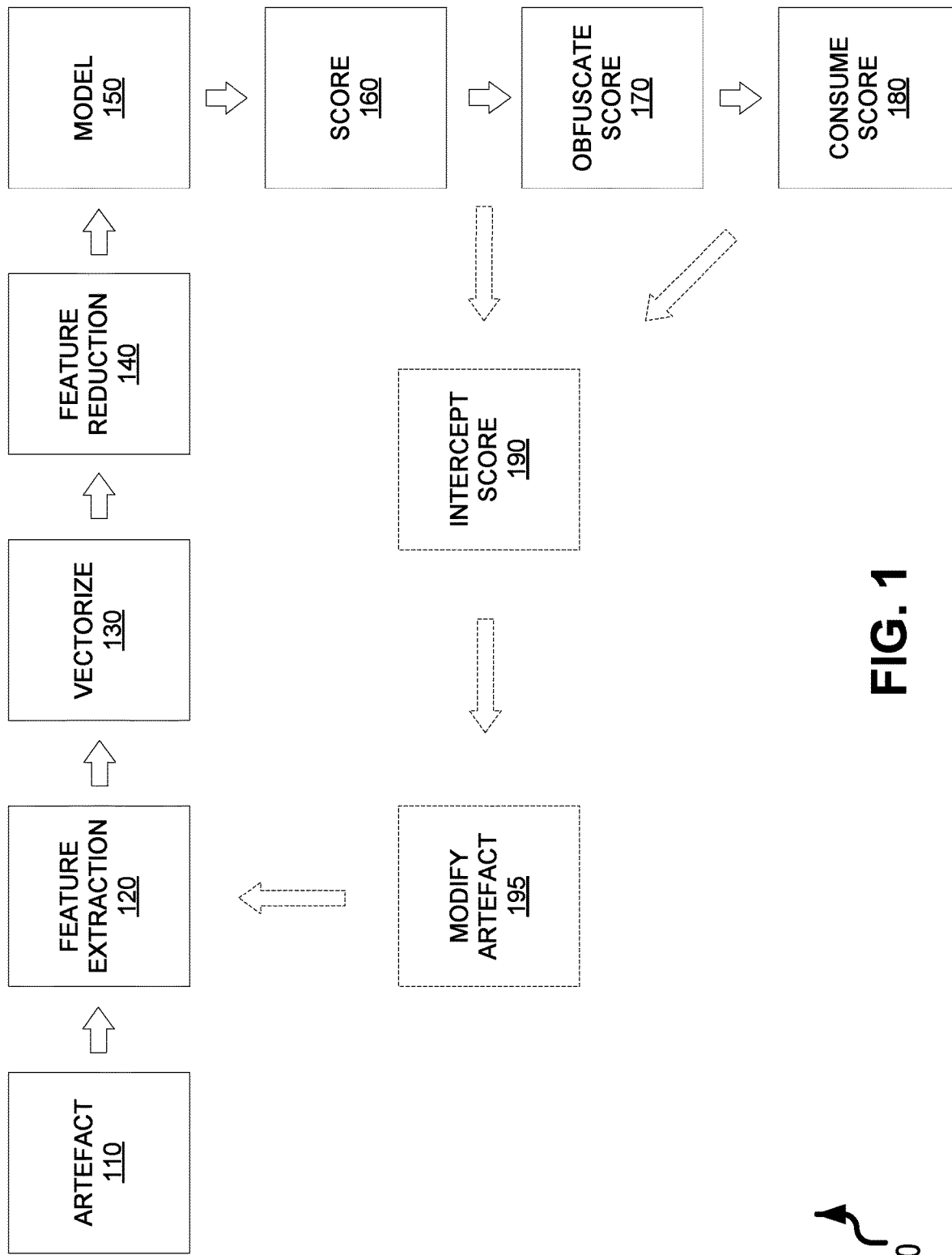
FIG. 1 is a process flow diagram illustrating a first computer-implemented workflow for obfuscating a score from a classification model.

FIG. 1 is a process flow diagram 100 illustrating a sample computer-implemented workflow for use with the current techniques for score obfuscation. Initially, an artefact 110 can be received (e.g., accessed, loaded, received from a remote computing system, etc.). The artefact 110 can be a file, a portion of a file, metadata characterizing a file, and/or source code. This artefact 110 can be parsed or otherwise processed by an observer. In particular, the observer can extract 120 features (sometimes referred to as attributes or observations) from the artefact and vectorize 130 such features. Further, depending on the complexity and/or quantity of features within a vector, a feature reduction operation 140 can be performed on the vector which reduces the amount of dimensions of such vector. The feature reduction operation 140 can utilize various techniques including, but not limited to, principal component analysis and random projection matrices to reduce the number of extracted features within the vector while, at the same time, remaining useful (i.e., for classification purposes, etc.) when input into the classification model 150. The classification model 150 can take many forms including, without limitation, a logistic regression model, a neural network (including concurrent neural networks, recurrent neural networks, generative adversarial networks, etc.), a support vector machine, a random forest, a Bayesian model, and the like. The output of the classification model 150 can be a score 160 which, as described in further detail below, can be obfuscated 170. As used herein, unless otherwise specified, the score can be a numeric value, a classification type or cluster, or other alphanumeric output which, in turn, can be used by a consuming process 180 or application to take some subsequent action. The entity consuming the score, at 180, is provided with information characterizing the coordinated interleaving so that the underlying score can be determined (i.e., reverse engineered, etc.). For malware applications, the score can be used to determine whether or not to access, execute, continue to execute, quarantine, or take some other remedial action which would prevent a software and/or computing system from being infected or otherwise infiltrated by malicious code or other information encapsulated within the artefact 170.

FIG. 1 further illustrates the interception of the score 190. Such interception can occur, for example, when the API of the consuming application is known; by dumping DLL/SO exports with link, nm, objdump; by using various reverse-compilers; by observing stack/heap/registers during execution for function-calling behavior, and the like. Other API (i.e., function)-discovering techniques can also be used.

In an arrangement in which the output of the model 150 can be readily ascertained (e.g., a single model 150 arrangement without score obfuscation), the score 160 can be used by a malicious actor to modify the artefact 195 and repeat the process until such time that a desired score 160 by the corresponding model 150. For example, the modified artefact 195 can encapsulate malicious script and small changes to the artefact 110 could result in the corresponding classification model 150 classifying such modified artefact 195 as being benign.

Modifications to an artefact 150 can be done in such a way as to maintain the original character or nature of the artefact 150. In the example of an actor attempting to modify a malicious file (malware), any modifications must be such that the malware still operates as intended. Such modifications can be made by (for instance) adding to, removing from, or altering un-used portions of the malicious file. As these portions of the file are unused, they have no effect on the realized behavior of the file, but may result in a different score 160 from the model 150. Alternatively or additionally, used sections of the artefact 150 can also be modified, so long as the final function of the malware is left intact.

Whether manually, or in an automated system, the actor or system will typically make many small changes, and get new scores 160 from the model 150. Any change that moved the score 160 in the desired direction (i.e. in the malware example, moving the score closer to a value that is interpreted as benign) is maintained, while other changes are discarded. Such an iterative process can be repeated until the cumulative changes to the artefact 110 result in a cumulative change in the score 150 which accomplishes the desired effect. The obfuscation techniques provided herein can interrupt this cycle of iterative improvements by masking the true effect of each change to an artefact 110 with a false or misleading change in the score 160 which is determined by the obfuscation techniques herein.

The score obfuscation, at 170, causes the output score to be changed to a new value. As noted above, the purpose of the techniques described herein are to give a false signal to an adversary, which misleads them into believing their iterative changes are affecting the model score. The score returned by the API of the model 150 (i.e., the obfuscated score 170) is in fact a false score, designed in such a way that it will appear to respond to the adversary's manipulation of the input artefact, but in reality is interleaving information about the true score inside of the false one. The consuming application of processes (at 180) must extract the true score information from the false one.

As provided herein, there are various methods by which the necessary information about the true score can be interleaved into the digits or characters of the model score. In each case, an initial false score, here referred to as the pseudo-score, is generated. Examples of how to generate such a pseudo-score are described herein. The true score produced by the model 160 is then interleaved 170 by one of many possible methods into the digits or characters of this pseudo-score. The following are examples of how such interleaving can be accomplished.

Example Interleaving Method 1

Model scores are sometimes interpreted as in indicator of one of many classes that an artefact 110 belongs to. Consuming applications 180 will use the score to determine the class. In the case of a two-classification model, such as those that classify an artefact as "malicious" or "benign", the score 160 might be divided at zero, such that negatives values of the score indicate the artefact is to be considered malicious, whereas positive values of the score would indicate that the artefact is benign. In this method, the classification, rather than the score, is encoded into the pseudo-score's insignificant digits. With this technique, a digit or sequence of digits can be selected to represent each classification that the model can produce. The digits which are replaced in the pseudo-score need not be contiguous. For example, values in a particular decimal place or places within the pseudo-score can be replaced with the digit(s) which encode the true model classification. The consuming process or application can receive the pseudo-score and ignore its value, and instead, extract the digits from the decimal places which encode the classification and associated the digits it finds there with the true classification given by the model. For example, if the digits "22" in the $6^{th}$ and $7^{th}$ decimal places of the pseudo-score encode a classification of "benign", the score obfuscation function 170 could return a value such as "1.0000022000". The consuming process 180 would look at the appropriate decimal places, extract the "22" and interpret it as indicating the original artefact 110 was "benign".

Example Interleaving Method 2

An extension of the example method 1 (above) is to choose more than one digit (or series of digits) for encoding each model class. A deterministic function, based on either the true score 160, or the vector 130, or the reduced vector 140, or some combination of these, would determine which of the plurality of class encodings would be used to replace the proper digits in the pseudo-score. This ensures that any particular artefact will always have the same class encoding used. If the function for choosing which of the plurality of class encodings is not deterministic, then subsequent scores from the same artefact could be used to discover the interleaving scheme. As an example of this method, the digits "01" and "35" could both encoded a classification of "malicious" in a particular model, and the deterministic function to choose which of these encodings to use was based on the final digit of the true score being even or odd. The score obfuscation method would look at the final digit of the true score. If that final digit was even, then the obfuscator would replace the encoding digits of the pseudo-score with "01". If the final digit of the true score was odd, it would instead to the replacement with "35". Any digit of the true score could be used, and any heuristic for determining which of the plurality of classification encodings can be used. (The final digit being odd and even is just an illustrative example). Other methods for choosing which of the plurality of the class encodings to use might be based on mathematical operations on the true score, logical operations over the vector or reduced vector, and the like.

Example Interleaving Method 3

Rather than using direct encodings of the classification, this method describes the interleaving of logical symbols to reconstruct the classification in the pseudo-score's insignificant digits. With this variation, instead of encoding the classification as a set of integers (whether only one, or one from a plurality), the true classification can encoded as a set of several digits, paired with a logical operation to be conducted upon those digits. The logical operation can be very simple or very complex, as decided by the implementer. To interleave the information needed to decode the true score, the score producer would choose values such that when extracted from the pseudo-score and input into the chosen logic function, the logic function would output the appropriate model classification.

As an example, a possible logical operation is: classification=(sum(digit3, digit6, digit9) % n_classes), where digit3, corresponds to the third digit of the pseudo-score, and so on, "%" represents the modulo operator, and n_classes represents the number of classes that the machine learning model can produce. If the correct model classification was "0", then the scoring function would choose a value that was a multiple of 3 (so that value % 3=0) and less than 28 (so that it can be the sum of three digits). Then, the scoring function would break that value into three smaller values which summed to it, and replace the third, sixth, and ninth digits of the pseudo-score with those three digits. Thus, the consumer of the score would be able to use the given logical operation to determine the true classification.

Example Interleaving Method 4

Interleaving the true score into the psuedo-score's insignificant digits. With this example, instead of encoding only the class of the true model score, the entire score can be encoded into the pseudo-score. For instance, the first five (for example) digits of the true score could replace five (for example) digits of the pseudo-score. The digits could be replaced in order, in reverse order, or in any mixed order. The replaced digits need not be contiguous. To encode the sign of the true score, a final digit could be used elsewhere in the pseudo score. For instance, an even value might encode "positive" while an odd value might encode "negative".

The consumer of such model scores would ignore the pseudo-score, and instead pick out the appropriate digits, put them back in the correct order, and add the appropriate sign, to reconstruct the true score.

In all such methods as those provided, it is desirable that the digits of the pseudo-score which are replaced by the score obfuscation function be far to the right of the decimal place. This ensures that they do not cause the pseudo-score value to shift wildly after the replacement.

The pseudo-score which is returned by the score obfuscation function needs to look like and behave as much like a true score as possible to the adversary. The advantage of the techniques herein is to mislead the adversary into trying to modify the pseudo-score, rather than the real one.

Several methods are provided herein to produce believable pseudo-scores.

Pseudo-Score Generation Method 1:

Along with the true model, a dummy model can be created, which takes real model vectors or reduced vectors as its input, but produces scores that are not related to the scores of the true model. It may be desirable that the dummy model be small in terms of its memory and computational footprint on the computing system, but this is not a requirement of the method described herein. Once the true score is computed by the real model, the dummy model would likewise be invoked to produce the pseudo-score, which would then be operated upon by the score obfuscation method chosen. Any machine learning model could be used, and it is not a requirement that the output of the dummy model be meaningful in any way.

Pseudo-Score Generation Method 2:

Time-based Noise. The pseudo-score can be related to the current time. The time used could be the current system time, a time retrieved from a remote server, or any other source of timekeeping available. Many types of periodic functions can be used, such as a trigonometric function, trochoid or cycloid function, square wave function, sawtooth function, triangle wave function, and the like. Multiple periodic functions can be combined. The value of the current time would be input into the chosen periodic function or combination of functions, and the output would be used as the pseudo-score. The implementer would choose parameters for the chosen periodic function that produced the range of scores desired, and the rate at which those scores changed versus a given change of time.

The unit of measurement of current time can determine how much time would elapse before the score would change. For instance, if time was measured in seconds, then two measurements of the score of an artefact within a fraction of a second would often produce the same score. The implementer would choose the unit of time such that the score changed as quickly or as slowly as desired. In some cases, it may be desirable to hold the score steady for a short period of time, to mislead the adversary into thinking none of the changes to the artefact have successfully affected the model score. Then, when the score did change due to the advancement of time, the adversary might be further misled into believing that whichever change they had most recently made was a particular effective change, and might try to make more of those types of changes, though in reality, there may be no particular relationship with the true score.

Pseudo-Score Generation Method 3:

Any mathematical function based on the vector, reduced vector, or model score, or some combination of these, can also be used to produce a useful pseudo-score. In general, such a mathematical function should be deterministic so that the same artefact always yields the same pseudo-score. This is not a requirement of the method but would likely aid in deceiving an adversary. The details of such a mathematical function are not important, and the output of the function need not be useful in any way. However, it may be desirable to ensure that the range of scores produced by this function were believable to the adversary, and as such, might be constrained to the same set of values, or range of values that the true score. A simple example of such a function might be pseudoscore(vector)=A*sum(vector)−B, where A and B are scaling parameters chosen by the implementer to produce pseudo-scores in a desired range.

It is important that this function not be too closely related to the true scoring function, whether intentionally or unintentionally. In particular, the function should be chosen such that changes to the artefact will often yield changes to the true score and pseudo-score that move in opposite directions. For instance, that a change to the artefact will sometimes produce a positive change to the pseudo-score and a negative change to the true score, and vice versa. If the pseudo-score is statistically correlated to the true score, then the methods of score change used by an adversary could work just as well on the pseudo-score as the true one, making this method of score obfuscation less helpful.

Figure 2:
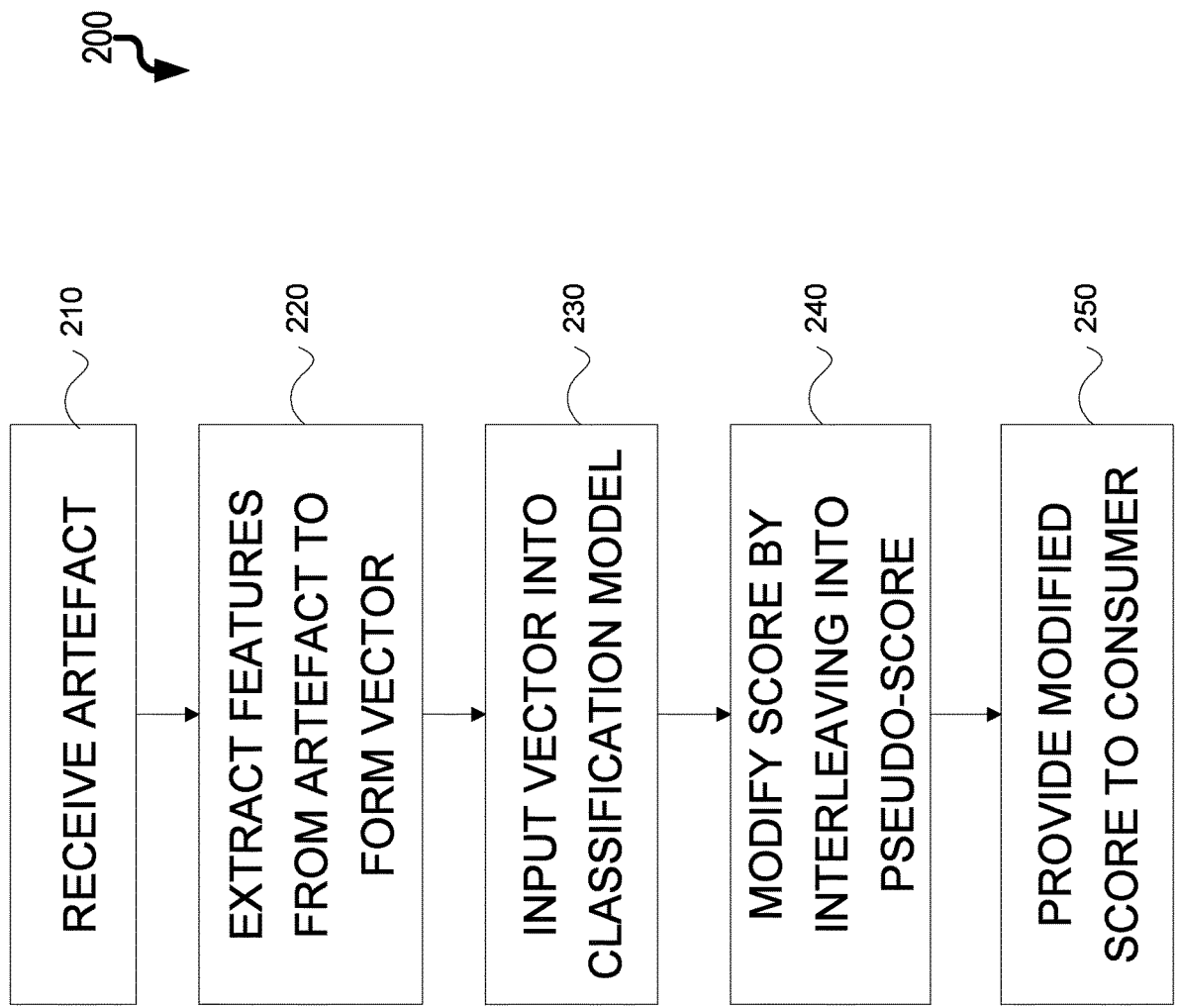
FIG. 2 is a diagram illustrating an example of obfuscating a score from a classification model using coordinated interleaving.

FIG. 2 is a process flow diagram in which, at 210, an artefact is received. Thereafter, at 220, features are extracted from the artefact so that a vector can be populated with such features. Next, at 230, the vector is input into a classification model to generate a score. This score is modified, at 240, by interleaving the generated score or a mapping thereof into digits of a pseudo-score. Therefore, the modified score is provided, at 250, to a consuming application or process. For example, the consuming application or process can use such score to make a determination of whether or not to access, execute, or continue to execute the artefact (i.e., it can be used to prevent malware from infiltrating a computing and/or software system, etc.).

Figure 3:
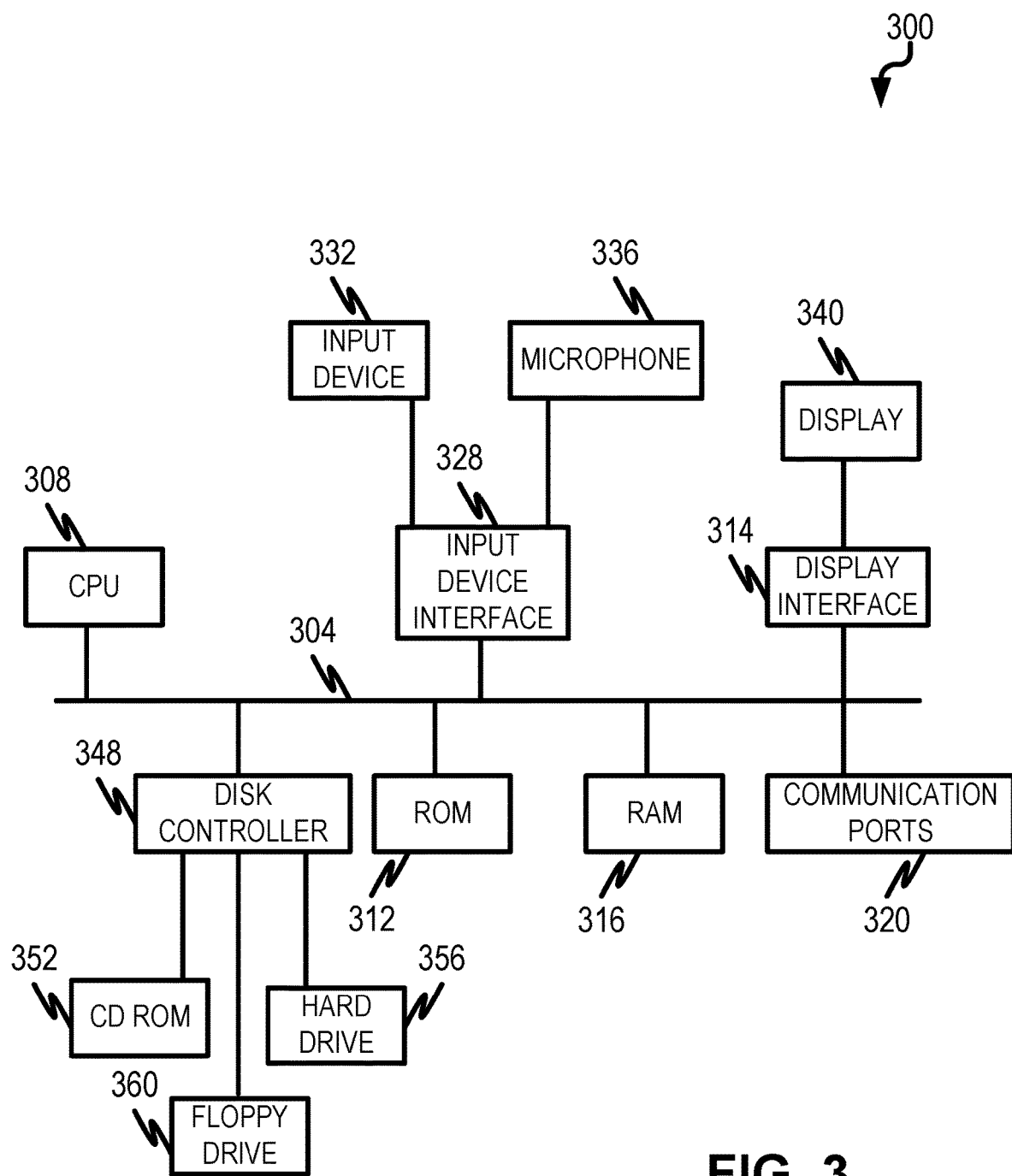
FIG. 3 is a diagram illustrating a computing device that can be used to implement aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers/ processor cores, etc.), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for obfuscating machine learning model scores, comprising:
   receiving an artefact;
   extracting features from the artefact and populating a vector;
   inputting the vector into a classification model to generate a score;
   modifying the generated score to result in a modified score obfuscating the generated score, the modifying comprising interleaving the generated score or a mapping thereof into digits of a pseudo-score; and
   providing the modified score to a consuming application or process, the consuming application or process being provided with information characterizing the interleaving so that the generated score prior to modification is determined.

2. The method of claim 1 further comprising reducing features in the vector prior to the inputting into the classification model.

3. The method of claim 2, wherein the features are reduced using random projection matrices.

4. The method of claim 2, wherein the features are reduced using principal component analysis.

5. The method of claim 1, wherein the classification model is a machine learning model trained using a training data set and providing a continuous scale output.

6. The method of claim 1, wherein the classification model characterizes the artefact as being malicious or benign to access, execute, or continue to execute.

7. The method of claim 6 further comprising: preventing access or execution of the artefact when the classification model characterizes the artefact as being malicious.

8. The method of claim 1, wherein the machine learning model comprises one or more of: a logistic regression model, a neural network, a concurrent neural network, a recurrent neural network, a generative adversarial network, a support vector machine, a random forest, or a Bayesian model.

9. The method of claim 1, wherein the modifying comprises encoding a classification of the classification model into digits of the pseudo-score.

10. The method of claim 9, wherein the modifying comprises interleaving logical symbols in the pseudo-score.

11. The method of claim 10, wherein the logical symbols comprise a set of digits paired with a logical operation to be conducted upon such digits by the consuming application or process.

12. The method of claim 1, wherein the modifying comprises interleaving the generated score into the pseudo-score without modification.

13. The method of claim 1 further comprising:
    inputting the vector into a second model to generate the pseudo-score.

14. The method of claim 1 further comprising:
    generating the pseudo-score using a time-based function.

15. The method of claim 1 further comprising:
generating the pseudo-score using a mathematical function.

16. A system for obfuscating machine learning model scores, comprising:
at least one data processor; and
memory storing instructions which, when executed by the at least one data processor, result in operations comprising:
receiving an artefact;
extracting features from the artefact and populating a vector;
inputting the vector into a classification model to generate a score;
modifying the generated score to result in a modified score obfuscating the generated score, the modifying comprising interleaving the generated score or a mapping thereof into digits of a pseudo-score; and
providing the modified score to a consuming application or process, the consuming application or process being provided with information characterizing the interleaving so that the generated score prior to modification is determined.

17. The system of claim 16, wherein the classification model is a machine learning model trained using a training data set and providing a continuous scale output.

18. The system of claim 17, wherein the classification model characterizes the artefact as being malicious or benign to access, execute, or continue to execute.

19. The system of claim 18, wherein the operations further comprise: preventing access or execution of the artefact when the classification model characterizes the artefact as being malicious.

20. A computer-implemented method for preventing the execution of malicious files or code comprising:
receiving an artefact;
extracting features from the artefact and populating a vector;
inputting the vector into a machine learning model to generate a score;
modifying the generated score to result in a modified score obfuscating the generated score, the modifying comprising interleaving the generated score or a mapping thereof into digits of a pseudo-score;
providing the modified score to a consuming application or process, the consuming application or process being provided with information characterizing the interleaving so that the generated score prior to modification is determined; and
preventing access or execution of the artefact when the modified score characterizes the artefact as being malicious.

* * * * *